United States Patent [19]
Balaz

[11] 3,942,921
[45] Mar. 9, 1976

[54] DIE AND AIR NOZZLE

[75] Inventor: Alexander Balaz, Barrington, Ill.

[73] Assignee: The Quaker Oats Company, Chicago, Ill.

[22] Filed: June 12, 1974

[21] Appl. No.: 478,756

[52] U.S. Cl............... 425/4 C; 222/193; 425/817 C
[51] Int. Cl.². A29N 17/00; B29D 27/00; B29F 3/08
[58] Field of Search........ 425/378, 379, 376, 817 C, 425/462, 4 C, 326 R, 467, 71; 239/430; 222/190, 193, 195

[56] References Cited
UNITED STATES PATENTS

| | | | |
|---|---|---|---|
| 1,281,592 | 10/1918 | Laskey | 425/326 R X |
| 3,193,604 | 7/1965 | Mercer | 425/71 X |
| 3,241,503 | 3/1966 | Schafer | 425/462 |
| 3,309,734 | 3/1967 | Bynum et al. | 425/376 |
| 3,451,103 | 6/1969 | Aykanian et al. | 425/326 X |
| 3,466,705 | 9/1969 | Richie | 425/4 C |
| 3,545,042 | 12/1970 | Brozenick et al. | 425/4 C |
| 3,702,619 | 11/1972 | Son | 239/430 X |
| R26, 962 | 10/1970 | Shroyer | 425/4 C |

FOREIGN PATENTS OR APPLICATIONS 46-9672  11/1971  Japan.................. 425/467

Primary Examiner—Francis S. Husar
Assistant Examiner—David S. Safran
Attorney, Agent, or Firm—Richard H. Shear; Donnie Rudd; Mathew R. P. Perrone, Jr.

[57] ABSTRACT

An apparatus for use as an extruder die is disclosed. The die comprises a cylindrical housing surrounded by heating means. Within the die is provided gas injection means which can be used to expand the hot extrudate.

5 Claims, 1 Drawing Figure

U.S. Patent  March 9, 1976  3,942,921
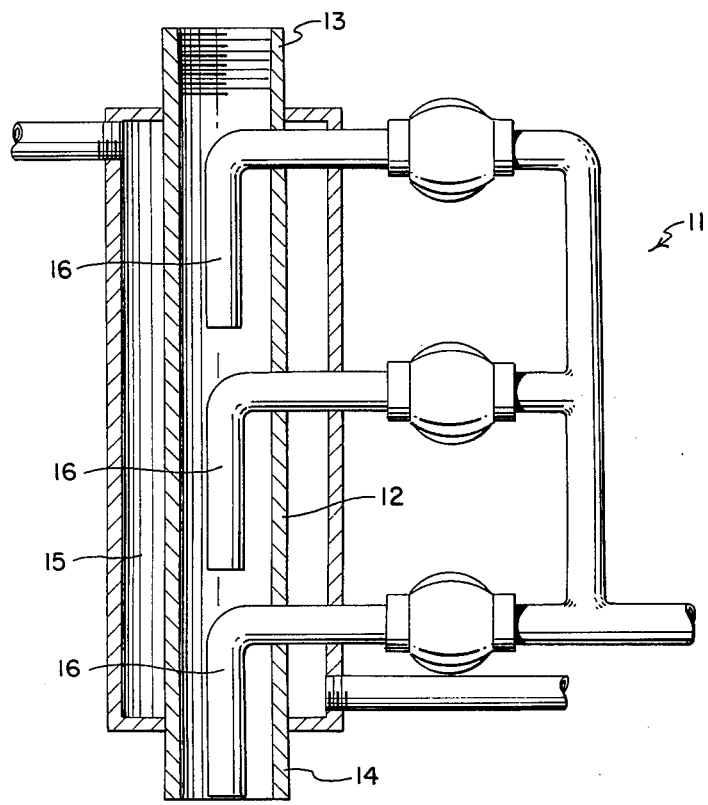

DIE AND AIR NOZZLE

BACKGROUND OF THE INVENTION

The use of extruder dies located at the exit of an extruder barrel for shaping a hot dough-like mixture is well known. For example, dry foods are often formed by extrusion through a die. Quite often a hot mixture must be cooled immediately upon its entering the open atmosphere from the extruder die. It is often desirable as well that a hot mixture undergo expansion so that voids can be created in the final product, i.e., an expanded pet food. Most dies currently used, however, provide no means to cool the hot mixture before it enters the open atmosphere. These dies furthermore provide no means to expand the hot mixture so as to produce these voids. The little expansion that occurs does so because of the change in pressure at discharge. The present invention, however, provides a means capable of both cooling a hot extrudate as well as enhancing expansion of that extrudate.

SUMMARY OF THE INVENTION

It is, therefore, an object of this invention to provide a novel apparatus for use as an extruder die.

Another object of the present invention is to provide means within an extruder die for expanding a hot extrudate.

Yet another object of the present invention is to provide an apparatus capable of cooling a hot extrudate as it leaves the die.

Still another object of the invention is to provide a die for connection with a means for blending a dry pet food.

These and other objects of the invention are accomplished by providing an extruder die comprising an inner housing having air injection nozzles located within the housing. By injecting air through said air injection nozzles into the hot mixture, the mixture can either be cooled or it may be expanded so as to form voids in the final product.

BRIEF DESCRIPTION OF THE DRAWING

This invention may be more fully described but is not limited by the enclosed drawing wherein the FIGURE is an illustration of an extruder die having air injection means located therein.

DETAILED DESCRIPTION OF THE INVENTION

In accordance with the novel aspects of the present invention an extruder die is provided that is capable of both cooling a hot extrudate as well as expanding the extrudate to form a spongy type product.

More specifically, this expanded, spongy product is produced by injecting a gas directly into the mass of the hot extrudate substantially parallel to the flow of the hot mixture through the extruder die. Expansion produced in this manner would be highly beneficial in the formation of expanded plastic products and food products such as puffed cereals. If desired, the pressure of the gas injected into the mixture may be low enough so that it will merely have a cooling effect and yet not expand the hot extrudate.

The FIGURE illustrates a cross-sectional view of a novel extruder die 11. This die is made up of three basic structures; the inner housing, the heating means, and the gas-injection means. At each end of the inner housing 12 is an opening. These openings are interconnected by a longitudinal bore. The opening at the upper portion of the housing acts as an inlet 13 while the opening at the lower portion of the housing acts as an outlet 14. Typically the inner housing would be composed of a one-section hollow pipe capable of engagement with means used to blend a mass of material, i.e. an extruder. Engaged about the inner housing 12 is heating means 15 capable of maintaining the temperature within the die equal to that within the extruder. As shown in the FIGURE the heating means may be an outer jacket sealingly engaged about the inner housing. The outer jacket is provided with an inlet for the introduction of steam into said jacket, and an outlet for the discharge of condensation. Protruding through both the heating means and the inner housing are gas injection means 16. The gas injection means 16 is connected to a pressurized gas source, such as a pressurized air tank, not shown. Either one or a plurality of gas injection means spaced equidistant, or longitudinally spaced and coaxial, to one another may be employed. Preferable gas injection means comprise an air injection nozzle composed of stainless steel.

The extruder die operates in the following manner. When the inlet 13 is connected with a screw conveyor a hot mixture is forced through the inner housing 12. The inner housing may be heated to an elevated temperature by the introduction of steam into these outer jackets. As the hot mixture flows through the housing 12, air is injected through the gas injection source 16 so that the hot mixture undergoes expansion before exiting through outlet 14. If it is desired to cool the hot extrudate before its leaving the die, cooling water may be introduced into the outer jacket in lieu of steam. Furthermore, cool air or air at ambient temperature may be injected through the gas injection means 16 to further cool the mixture. The pressure of such injection should be low enough to prevent expansion of the extrudate if expansion is not desired.

Obviously modifications of this invention are possible. It is understood, therefore, that this application is intended to cover any variations, uses, or adaptations of the invention as may be considered to be known or customary practice in the art to which the invention pertains.

Having fully described and disclosed the invention, it is claimed:

1. An extruder die having an upper portion and a lower portion and useful for shaping and expanding a hot food mixture comprising an outer heating means engaged about an inner housing having an inlet in the upper portion of said housing and an outlet in the lower portion of said housing; said inlet and outlet being interconnected by a continuous longitudinal bore within said housing; and gas injection means protruding through said housing into said bore near the center thereof said injection means comprising longitudinally-spaced, coaxial nozzles whereupon more than one gas stream may be injected into said bore in a downwardly direction progressively one stream after the other.

2. A die according to claim 1 wherein said outer heating means comprises a heating jacket sealingly engaged about said inner housing.

3. A die according to claim 1 wherein said air nozzles are composed of stainless steel.

4. An extruder die having an upper portion and a lower portion and useful for expanding a hot food mixture comprising a one-section cylindrical pipe having an inlet in its upper portion capable of connection with means to blend pet food and an outlet in its lower portion; said inlet and outlet being interconnected by a single straight line continuous longitudinal bore within said pipe; an outer heating jacket sealingly engaged about said pipe; and a plurality of stainless steel L shaped air injection nozzles axially spaced in the die equidistant from one another protruding through said heating jacket and a side portion of said pipe into said bore near the center thereof whereupon air streams may be injected into said bore in a downwardly direction progressively one after the other.

5. A die according to claim 4 wherein said means to blend pet food is a screw conveyor and wherein said means is sealingly engaged with said extruder die.

* * * * *